United States Patent

Tanigawa et al.

[19]

[11] Patent Number: 6,139,804
[45] Date of Patent: Oct. 31, 2000

[54] PROCESS FOR PRODUCTION OF POLYOXYMETHYLENE

[75] Inventors: Yukio Tanigawa; Hiromasa Matumoto, both of Kurashiki, Japan

[73] Assignee: Asahi Kasei Kogyo Kabushiki Kaisha, Osaka, Japan

[21] Appl. No.: 08/809,409

[22] PCT Filed: Oct. 20, 1995

[86] PCT No.: PCT/JP95/02161

§ 371 Date: Apr. 24, 1997

§ 102(e) Date: Apr. 24, 1997

[87] PCT Pub. No.: WO96/13524

PCT Pub. Date: May 9, 1996

[30] Foreign Application Priority Data

Oct. 27, 1994 [JP] Japan .................................... 6-286157

[51] Int. Cl.[7] ................................................... C08F 6/12
[52] U.S. Cl. .......................... 422/135; 422/134; 366/83; 528/137; 528/138; 528/230; 528/250
[58] Field of Search .................................... 422/134, 135; 528/137, 138, 230, 249, 250; 366/83

[56] References Cited

U.S. PATENT DOCUMENTS

| 4,105,637 | 8/1978 | Semanchik et al. . |
| 4,343,929 | 8/1982 | Sugio et al. ............................ 422/137 |
| 4,625,001 | 11/1986 | Tsubakimoto et al. . |
| 4,769,427 | 9/1988 | Nowakowsky et al. ................ 422/137 |

FOREIGN PATENT DOCUMENTS

| 0 198 719 | 10/1986 | European Pat. Off. . |
| 51-84890 | 7/1976 | Japan . |
| 56-59824 | 5/1981 | Japan . |
| 58-32619 | 2/1983 | Japan . |
| 59-93702 | 5/1984 | Japan . |
| 59-140215 | 8/1984 | Japan . |
| 61-238812 | 10/1986 | Japan . |

*Primary Examiner*—Timothy McMahon
*Attorney, Agent, or Firm*—Pennie & Edmonds LLP

[57] ABSTRACT

A process for producing a polyoxymethylene using a reactor having a discharging port having a weir, which process comprises introducing trioxane or a mixture of trioxane and a compound reactive therewith into the reactor from its feeding port and continuously recovering the powdery polyoxymethylene formed, from said discharging port having a weir. Owing to the presence of the weir, the residence time of reaction mixture in reactor is long, making high the conversion of the monomer.

1 Claim, 2 Drawing Sheets

PROCESS FOR PRODUCTION OF POLYOXYMETHYLENE

This application is a 371 of PCT/JP95/02161 filed Oct. 20, 1995.

TECHNICAL FIELD

The present invention relates to a reactor used for production of a polyoxymethylene widely used as an engineering plastic in electrical parts, automobile parts, mechanical parts, etc., as well as to a process for producing a polyoxymethylene using the reactor. More particularly, the present invention relates to an improved process for producing a powdery polyoxymethylene continuously and efficiently using, as a main starting material, trioxane or a mixture of trioxane and a compound reactive therewith.

BACKGROUND ART

Polyoxymethylenes have been produced by a method of subjecting trioxane to bulk homopolymerization or subjecting trioxane with ethylene oxide or trioxane with a cyclic formal such as dioxolane, trioxepane or the like, to bulk copolymerization in the presence of a cationically active catalyst.

In conventional polyoxymethylene production, a reactor of two shafts self-cleaning type, such as disclosed in JP-A-51-84890 has been used mainly. In this reactor of two shafts self-cleaning type, the discharging port for reaction mixture is provided at the bottom of the reactor and consequently the polyoxymethylene formed as an intended product is recovered downward. This reactor, however, has had a problem in that the short residence time of reaction mixture gives a low conversion. Hence, a number of proposals have been made in order to make the residence time longer and the conversion higher.

For example, JP-A-56-59824 proposes a process wherein, in each two adjacent paddles fixed to a rotary shaft of a reactor, the angle of one (back) paddle is advanced by a given amount from the angle of the other (precedent) paddle to control the transfer speed of reaction mixture to increase the filling ratio of the reaction mixture and prolong the residence time of the reaction mixture. Also, JP-A-61-238812 proposes a process wherein a reactor is lifted at the discharging port side so that the reactor is tilted as a whole by 1–10° from the horizontal state to prolong the residence time of the reaction mixture.

However, in the above process wherein the angle of one paddle is advanced from the angle of the other paddle to prolong the residence time, when the filling ratio is too high, the torque required for stirring increases sharply and surpasses the endurance limit of reactor (torque-out), making the continued reactor operation impossible. In the above process wherein a reactor is tilted slightly as a whole, both a very high conversion and very stable operation can be achieved; however, L/D (L: length of reactor, D: inside diameter of reactor) must be large in order to make sufficiently long the residence time, which requires a large reactor not suitable for industrial use.

The object of the present invention is to provide a process for producing a polyoxymethylene, wherein the residence time of reaction mixture in a reactor is long and thereby the conversion of trioxane can be increased.

DISCLOSURE OF THE INVENTION

The present inventors made a study in order to solve the above-mentioned problems of the prior art and, as a result, found out that the above object can be achieved by improving the structure of discharging port, discharging means for reaction mixture, of a reactor. The finding has led to the completion of the present invention.

The present invention provides a process for producing a polyoxymethylene using a reactor comprising:

two parallel rotary shafts for stirring and reacting raw materials for reaction which shafts are each provided with a plurality of paddles and rotated in the same direction, a twin-cylindrical case having an inner wall along the circumferences formed by the front ends of the individual paddles when the paddles are rotated, accommodating the two rotary shafts and provided with a heating and cooling jacket, a raw materials-feeding means for introducing trioxane or a mixture of trioxane and a compound reactive therewith, which is provided at one end of the case, and a discharging means for continuously recovering the powdery polyoxymethylene formed, which is provided at the other end of the case, said discharging means being a discharging port having a weir, which process comprises introducing trioxane or a mixture of trioxane and a compound reactive therewith, from the raw materials-feeding means into the case, stirring and reacting the raw materials for reaction to give rise to polymerization, and continuously recovering the powdery polyoxymethylene formed.

The reactor according to the present invention has a twin-cylindrical case provided with a jacket capable of heating and cooling the case, which accommodates two rotary shafts along the two central axes of the cylinders. The two rotary shafts are each provided with a plurality of paddles and rotated in the same direction. The rotary shafts thereby can stir and react the raw materials in small gaps formed between each two facing paddles fixed to the two different shafts and between each paddle and the inner wall of the case. The reactor further has, at one end, a raw materials-feeding means for introducing a main raw material, i.e. trioxane or a mixture of trioxane and a compound reactive therewith into the reactor and, at the other end, a discharging means for recovering the powdery polyoxymethylene formed.

The raw materials-feeding means is preferably a raw materials-feeding port.

In the present invention, the discharging means is preferably a discharging port having a weir. The discharging port is provided so as to extend nearly in a tangent direction to the circumference of the cylinder cross-section of the reactor, or in a radial direction of the cylinder cross-section, with the tangent direction being preferred. The discharging port is provided with a weir. The provision of the weir makes longer the residence time of reaction mixture up to discharging, making it possible to increase the conversion of trioxane. Therefore, the weir in the present invention includes any measure capable of controlling the time of reaction mixture up to discharging and prolonging the residence time of reaction mixture, whatever shape and size the measure may have, and should not be limited to the embodiments disclosed in the examples described below and the accompanying drawings.

When the discharging port is provided in the tangent direction, preferably a downward tangent direction (hereinafter referred to as lateral direction), the height of the weir of the discharging port from the lowest position of the cylinder inner wall is 0.1 D to 0.8 D, preferably 0.3 D to 0.6

D wherein D is the inside diameter of the reactor cylinder. A weir height of less than 0.1 D has a small effect on the prolongation of the residence time, making it impossible to increase the conversion of trioxane. A weir height of more than 0.8 D results in insufficient dischargeability for powdery polyoxymethylene and generation of torque-out, making the reactor operation impossible.

Meanwhile, when the discharging port is provided in the radial direction, preferably a downward radial direction (hereinafter referred to as downward direction), the height H of the weir of the discharging port from the lowest position of the cylinder inner wall is 0.1 D to 0.4 D, preferably 0.2 D to 0.3 D. A weir height of less than 0.1 D has a small effect on the prolongation of the residence time, making it impossible to increase the conversion of trioxane. A weir height of more than 0.4 D results in insufficient dischargeability for powdery polyoxymethylene and generation of torque-out, making the reactor operation impossible. A weir height of 0.5 D invites contact between the weir and the rotary shaft; thus, a weir height of 0.5 D or more is impossible to adopt actually. Since the discharging port is provided in the downward direction from the cylindrical case of the reactor, part of the paddle(s) in the vicinity of the discharging port, may have to be removed to fit a weir to the inner wall of the cylindrical case. In that case, a spacer ring 8 or the like can be used in place of the removed paddle for fixation of the paddles present after the discharging port.

In the reactor of the present invention, the residence time can be controlled by the height of the weir, irrelevantly to the feeding force of paddles. Even when there is sudden increase in amount of raw materials fed, the flow of the reaction mixture in reactor is dammed up by the weir, and the reaction mixture can be smoothly discharged from the discharging port since the upper surface of the reaction mixture is raised as a whole. Thus, the present reactor can solve the problems associated with the conventional reactors. In the present reactor, the weir can be a jacket type so as to enable heating or cooling.

BRIEF DESCRIPTION OF THE DRAWINGS

The reactor according to the present invention is hereinafter described in detail with reference to the accompanying drawings.

In FIG. 3, the height H of the weir 7 is 0.5 D wherein D is the inside diameter of the reactor cylinder.

In FIG. 4, the height of the weir is 0.25 D.

BEST MODE FOR CARRYING OUT THE INVENTION

In the reactor according to the present invention, two parallel rotary shafts 2,2' are accommodated in a twin-cylindrical case 1 having a hollow inside having a 8-shaped section formed by the overlapping of two eccentric circles of the same diameter. Outside the twin-cylinder is provided a single jacket 4 or a jacket 4 split into a plurality of portions, both for temperature control. To each of the two rotary shafts 2,2' are fixed a plurality of paddles 3,3' each having a convex lens-shaped section. All the paddles are rotated at the same speed in the same direction so that the front ends of each paddle can scratch the inner wall of the cylindrical case and the surface of a paddle facing the former paddle, fixed to the other shaft. This reactor is a continuous stirrer and mixer of self-cleaning type.

The sectional shape of each paddle may be, besides the above-mentioned convex lens shape, a pseudopolygonal shape such as pseudotriangular shape or the like. The thickness of each paddle is preferably about $\frac{1}{30}$ to $\frac{1}{2}$ of the inside diameter of the reactor cylinder. Each paddle is fixed to either of the two rotary shafts.

The gap between the front ends of each paddle and the inner wall of the cylindrical case is 2% or less, preferably 1% or less of the paddle major axis. The gap between one front end of any paddle fixed to one rotary shaft and the side of the paddle facing said paddle, fixed to the other rotary shaft is five times or less, preferably two times or less said gap between the front ends of each paddle and the inner wall of the cylindrical case.

Figure 2:
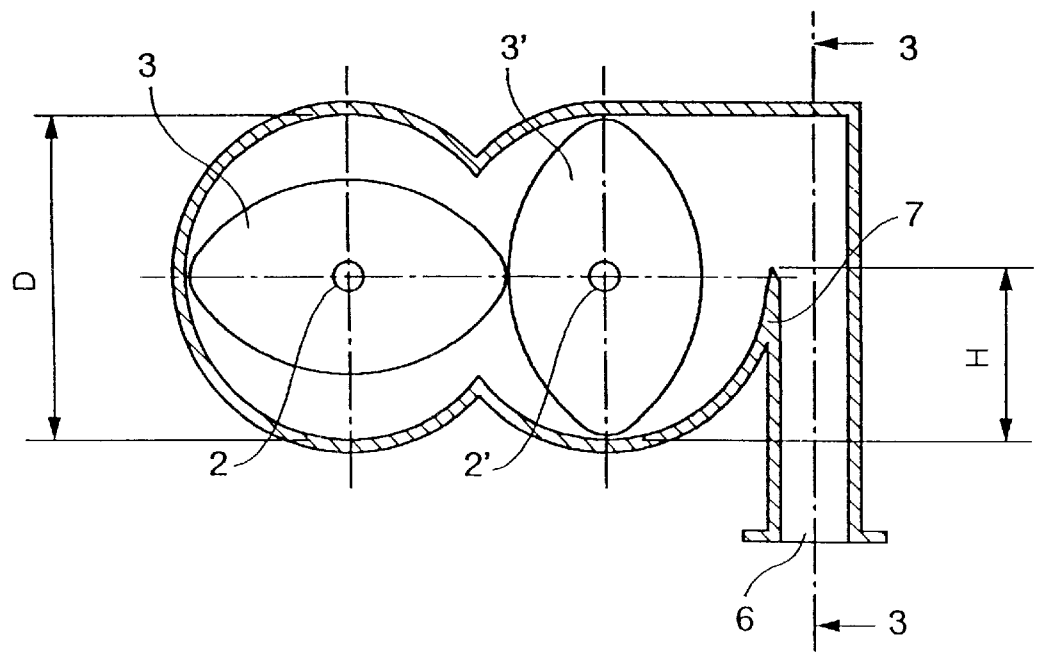
FIG. 2 is a cross-sectional view of the reactor of FIG. 1, taken at the B—B line.
Figure 3:
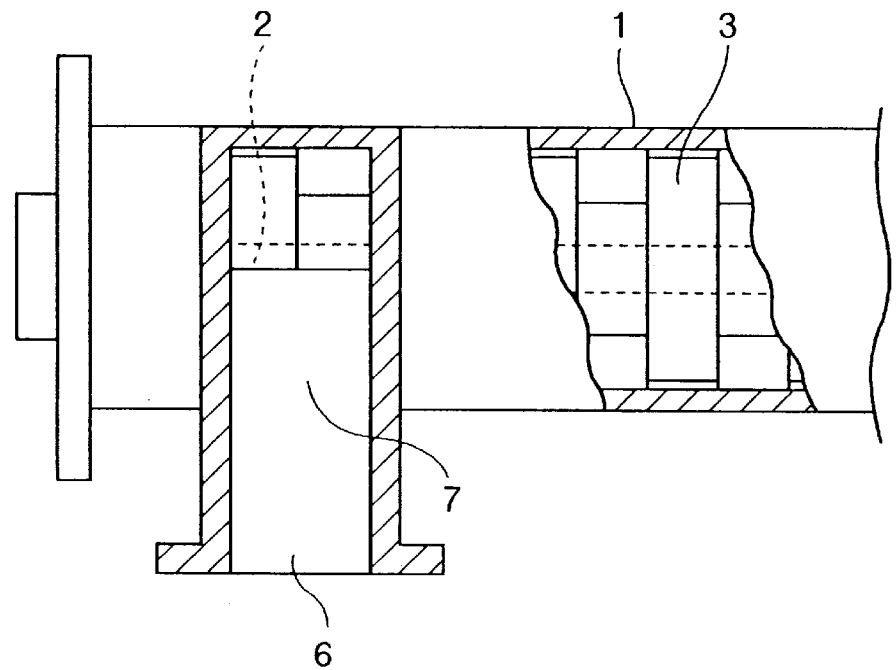
FIG. 3 is a view when the cross-section at the A—A line of FIG. 2 is seen from the arrow direction, where the section of a weir 7 formed in the discharging port provided in a lateral direction to the reactor cylinder is seen from the side of the reactor.

As shown in FIG. 2, the discharging port 6 is provided in a lateral direction to the reactor cylinder and is fitted with a weir 7 so that the residence time of reaction mixture can be controlled by changing the height H of the weir 7. The height H of the weir 7 is 0.1 D to 0.8 D, preferably 0.3 D to 0.6 D wherein D is the inside diameter of the reactor cylinder.

In carrying out the present invention, first the rotary shafts 2,2' of reactor shown in FIG. 2 are rotated at a desired number of revolution. The number of revolution is not particularly restricted but is set generally at 10–150 rpm.

Figure 1:
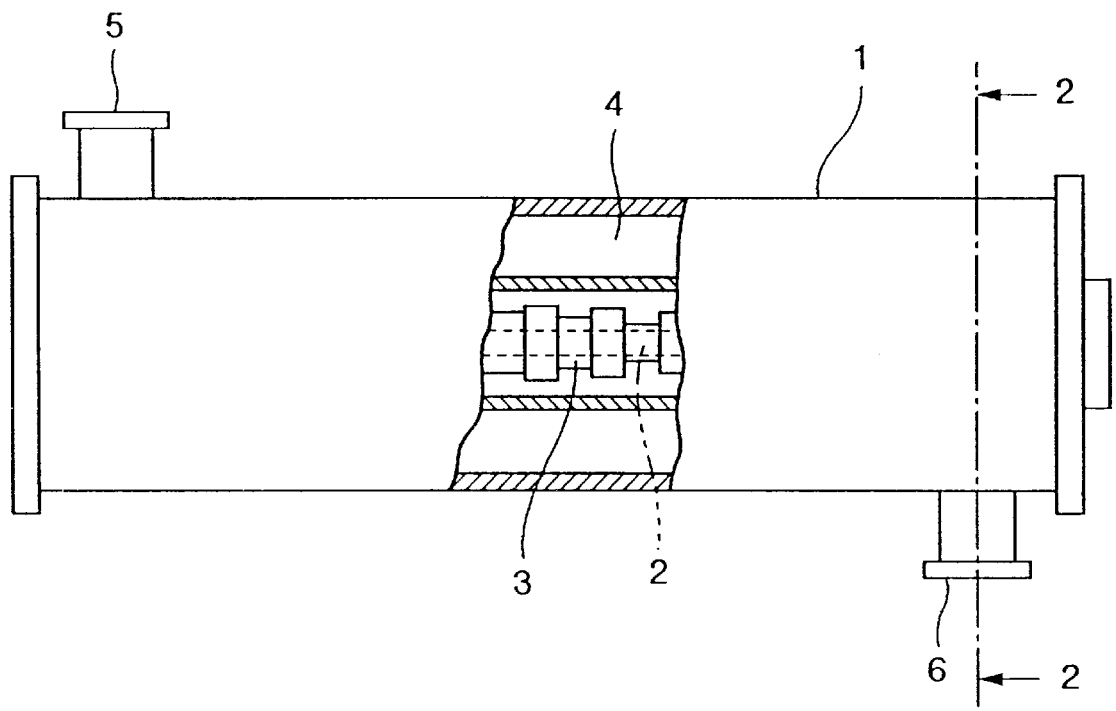
FIG. 1 is a partly sectional view of an example of the reactor according to the present invention.

Through the jacket 4 of reactor shown in FIG. 1 is allowed to flow a cooling water of 5–95° C. to remove the heat generated by polymerization. When the jacket is split into a plurality of portions, cooling waters of different temperatures may be allowed to flow through said portions, and the desired cooling water temperatures are 65–95° C. in the former half jackets and 5–40° C. in the latter half jackets.

Into the reactor of FIG. 1 in which the two rotary shafts are being rotated and a cooling water(s) of desired temperature(s) is (are) being allowed to flow through the jacket, are fed raw materials such as trioxane and the like from the raw materials-feeding port 5 of the reactor.

Into the feeding port 5 are fed liquid trioxane or a mixture of liquid trioxane and a comonomer (e.g. ethylene oxide or 1,3-dioxolane), a polymerization catalyst and a molecular weight modifier (e.g. methylal). When the comonomer is ethylene oxide, it is fed preferably by dissolving it in trioxane because it is a gas at normal temperature.

There takes place bulk homopolymerization of trioxane or bulk copolymerization of trioxane and a comonomer. In this reaction, the reaction mixture changes from a high-fluidity liquid to a viscous liquid at the early stage and, when the polymerization proceeds and the conversion of trioxane reaches about 40% or more, a solid bulk polyoxymethylene is formed. In this reactor, the reaction mixture is a high-fluidity or viscous liquid at the reactor portion close to the feeding port; when the reaction proceeds, a bulk polyoxymethylene is formed and, simultaneously therewith, is ground by the paddles and becomes a powdery polyoxymethylene; the powdery polyoxymethylene is moved towards the discharging port 6 of reactor while the polymerization proceeds further, and is taken out from the discharging port 6.

The process of the present invention is used for trioxane homopolymerization or copolymerization. When the present process is intended for copolymerization, it is preferable to use, as a main raw material, such a trioxane/comonomer mixture as to give a copolymer having a polyoxymethylene main chain containing 0.1–20 mole % of oxyalkylene units having 2 or more carbon atoms. The comonomer includes cyclic ethers and cyclic formals such as ethylene oxide, 1,3-dioxolane, 1,4-butanediol formal, trioxepane and the like.

As the polymerization catalyst, cationic polymerization catalysts of ordinary use are used. Preferable of such catalysts are boron trifluoride, a boron trifluoride hydrate and a boron trifluoride-ether complex, and more preferable are boron trifluoride-diethyl ether complex and boron trifluoride-dibutyl ether complex.

The polymerization temperature is in a range of 60–130° C., preferably 65–115° C.

With the reactor according to the present process, a powdery polyoxymethylene can be obtained efficiently and continuously and long-term continuous operation with no trouble is possible.

The present invention is hereinafter described in more detail with reference to Examples.

Example 1 (present invention)

A reactor shown in FIG. 1 was used. The reactor has a cylinder inside diameter of 128 mm and a L/D (length/diameter) ratio of 8, and two rotary shafts are each provided with a feed screw having a length of 1 D right under the raw materials-feeding port 5.

The reactor has paddles 3,3' as shown in FIG. 2. The gap between the front ends of each paddle and the inner wall of the cylindrical case is 4 mm or less. The paddles are fitted after the feed screw with the angle of any paddle being advanced by 45° in the rotational direction from the angle of the precedent paddle. The height of the weir of the discharging port is 0.5 D.

Into the reactor were fed 20 kg/hr of liquid trioxane, 400 g/hr of 1,3-dioxolane and a cyclohexane solution containing 0.02 mM, per mole of trioxane, of boron trifluoride-dibutyl ether complex and 1 mM, per mole of trioxane, of methylal. The polymerization temperature was 90° C., and the rotational speed of each front end of paddle was 3 m/min. From the discharging port was obtained a fine-particle polymer containing 15% of unreacted materials, which passed through a 10-mesh sieve.

No abnormality was encountered even after the 300-hour continuous operation.

Example 2 (present invention)

Using the same reactor as in Example 1, an operation was started under the same conditions with respect to amounts of raw materials fed, polymerization temperature, etc. as in Example 1 except that the height H of the weir 7 of the discharging port 6 was changed to 0.3 D.

From the discharging port was obtained a fine-particle polymer containing 18% of unreacted materials, which passed through a 10-mesh sieve.

No abnormality was encountered even after the 300-hour continuous operation.

Example 3 (present invention)

Using the same reactor as in Example 1, an operation was started under the same conditions with respect to amounts of raw materials fed, polymerization temperature, etc. as in Example 1 except that the height H of the weir 7 of the discharging port 6 was changed to 0.7 D.

From the discharging port was obtained a fine-particle polymer containing 13% of unreacted materials, which passed through a 10-mesh sieve.

Example 4 (present invention)

Using the same reactor as in Example 1, an operation was started under the same conditions with respect to amounts of raw materials fed, polymerization temperature, etc. as in Example 1 except that the 1,3-dioxolane used in Example 1 was replaced by 1,4-butanediol formal.

From the discharging port was obtained a fine-particle polymer containing 14% of unreacted materials, which passed through a 10-mesh sieve.

No abnormality was encountered even after the 300-hour continuous operation.

Example 5 (present invention)

Figure 4:
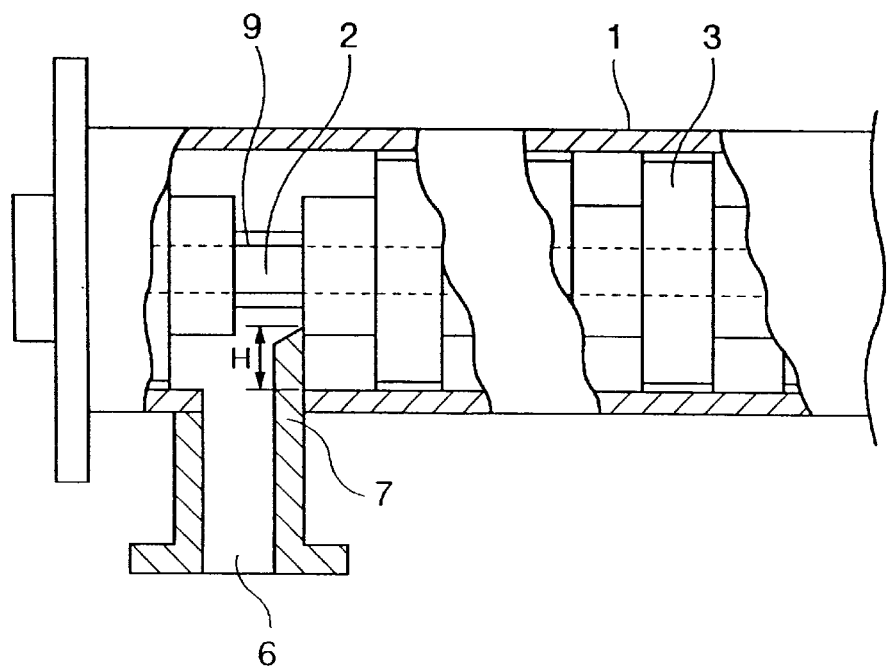
FIG. 4 is a view when the section of a weir 7 formed in the discharging port provided in the downward direction from the reactor cylinder is seen from the side of the reactor.

An operation was started under the same conditions with respect to amounts of raw materials fed, polymerization temperature, etc. as in Example 1, using the same reactor as in Example 1 except that the direction of the discharging port 6 was made in a downward direction to the cylindrical case of the reactor and the height H of the weir 7 was made 0.25 D as shown in FIG. 4.

From the discharging port was obtained a fine-particle polymer containing 19% of unreacted materials, which passed through a 10-mesh sieve.

No abnormality was encountered even after the 300-hour continuous operation.

Example 6 (comparison)

An operation was started under the same conditions with respect to amounts of raw materials fed, polymerization temperature, etc. as in Example 1, using the same reactor as in Example 1 except that the discharging port was provided with no weir.

From the discharging port was obtained a fine-particle polymer containing 29% of unreacted materials, which passed through a 10-mesh sieve.

Example 7 (comparison)

An operation was started under the same conditions with respect to amounts of raw materials fed, polymerization temperature, etc. as in Example 1, using the same reactor as in Example 1 except that the reactor was tilted by 50 so that the discharging port side of the reactor was higher.

From the discharging port was obtained, one hour after the start of the operation, a fine-particle polymer containing 28% of unreacted materials, which passed through a 10-mesh sieve.

What is claimed is:

1. A process for producing polyoxymethylene using a reactor comprising:

two parallel rotary shafts for stirring and reacting raw materials for the reaction which shafts are each provided with a plurality of paddles and rotated in the same direction, a twin-cylindrical case having an inner wall along the circumferences formed by the front ends of the individual paddles when the paddles are rotated, accommodating the two rotary shafts and provided with a heating and cooling jacket, a raw materials-feeding means for introducing trioxane or a mixture of trioxane and a compound reactive therewith, which is provided at one end of said case, and a discharging means for continuously recovering the powdery polyoxymethylene formed, which is provided at the other end of said case, said discharging means being a discharge port having a weir, wherein the discharging port of the reactor extends in a tangential direction to a circumference of one of said twin-cylindrical cases, and a height of said weir is between 0.5 and 0.8 D, wherein D is the inside diameter of said one cylindrical case, which process comprises introducing trioxane or a mixture of trioxane and a compound reactive therewith, from the raw materials-feeding means into the case, stirring and reacting the raw materials for reaction give rise to polymerization, and continuously recovering the powdery polyoxymethylene formed, by passing the powdery polyoxymethylene over the weir at a height that is at least about 0.5 D.

* * * * *